Dec. 29, 1931.  S. A. SPRINKLE  1,839,058
RAIL JOINT
Filed Feb. 14, 1931  4 Sheets-Sheet 1
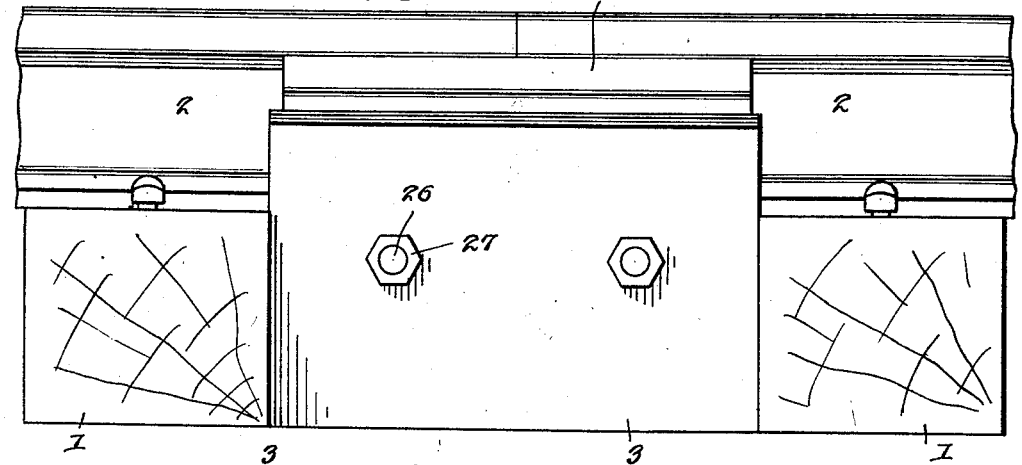
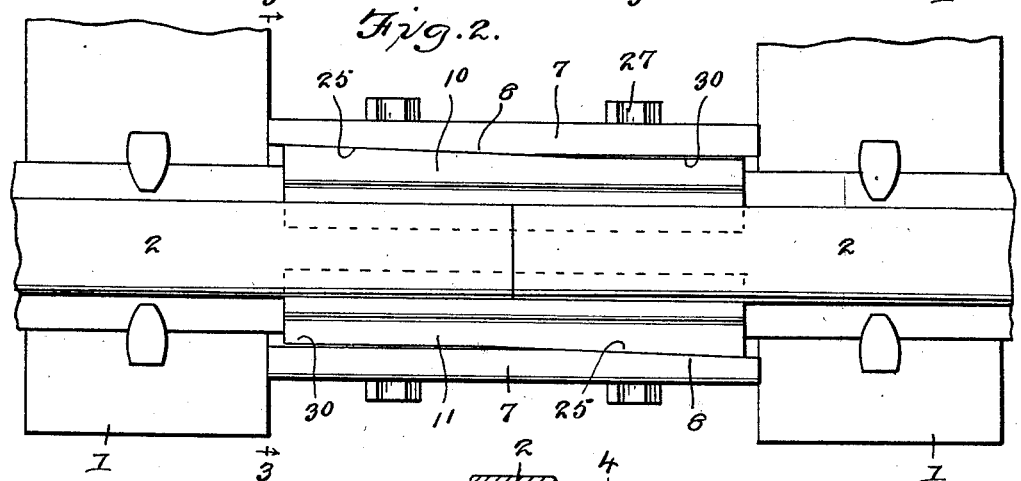
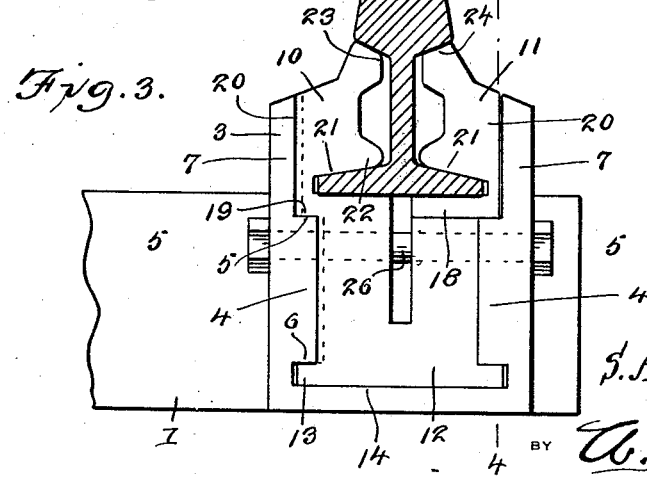
S. A. Sprinkle
INVENTOR
BY A. L. Evans
ATTORNEY Dec. 29, 1931.  S. A. SPRINKLE  1,839,058
RAIL JOINT
Filed Feb. 14, 1931  4 Sheets-Sheet 2
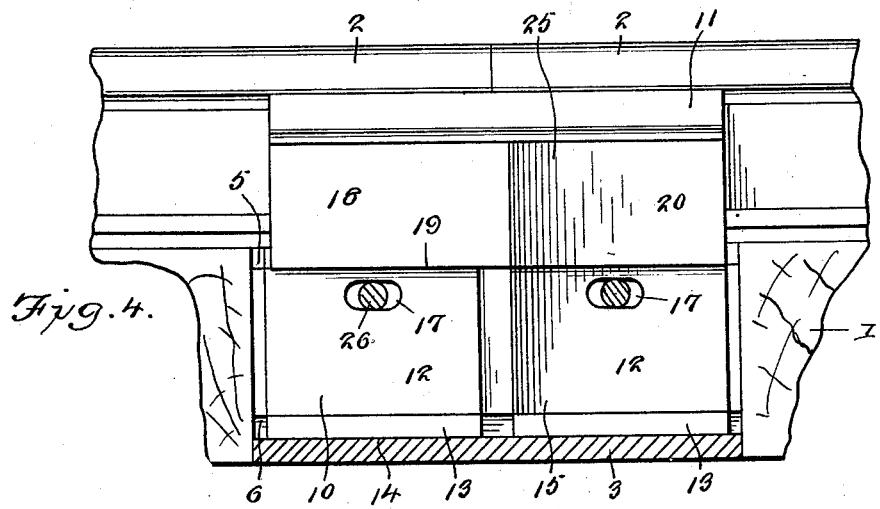
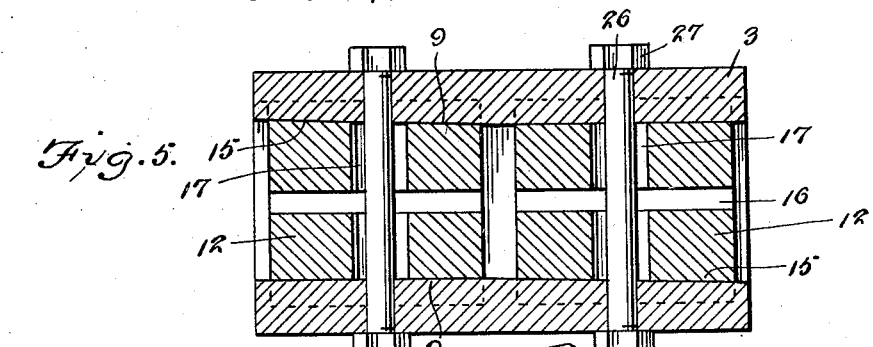
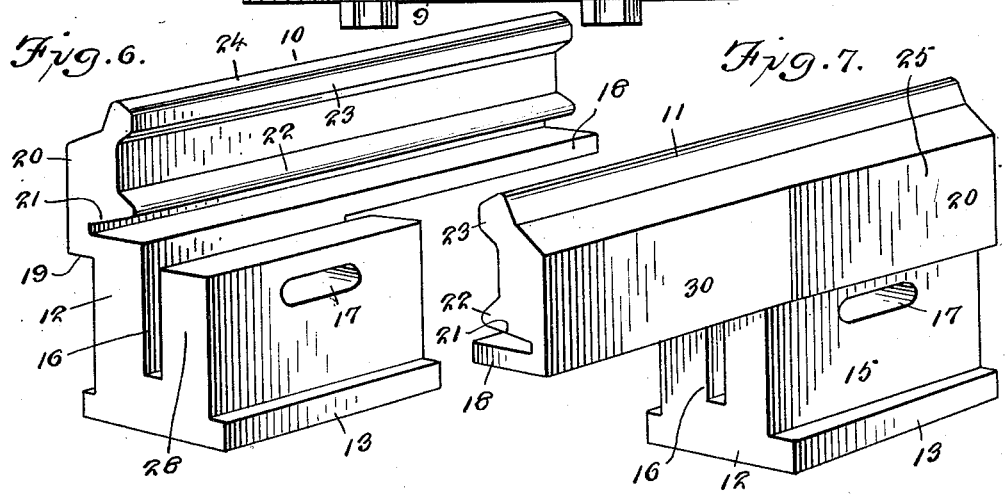
S. A. Sprinkle
INVENTOR
BY A. L. Evans
ATTORNEY Dec. 29, 1931.  S. A. SPRINKLE  1,839,058
RAIL JOINT
Filed Feb. 14, 1931    4 Sheets-Sheet 3
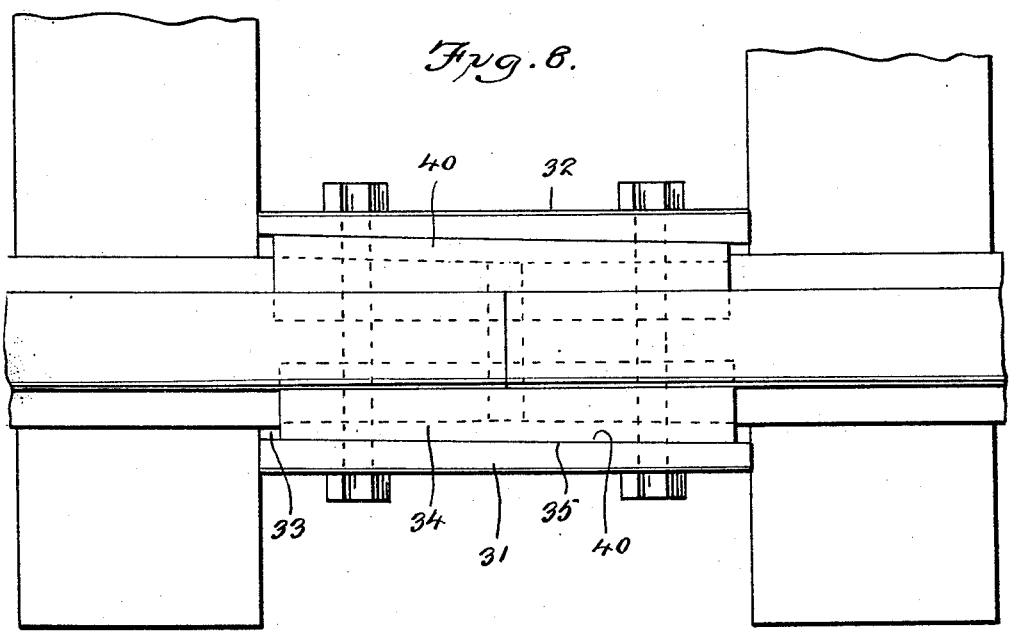
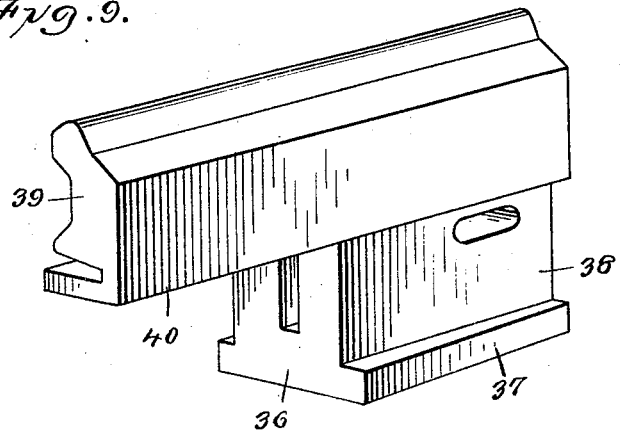
S. A. Sprinkle
INVENTOR
BY A. L. Evans
ATTORNEY Dec. 29, 1931.  S. A. SPRINKLE  1,839,058
RAIL JOINT
Filed Feb. 14, 1931  4 Sheets-Sheet 4
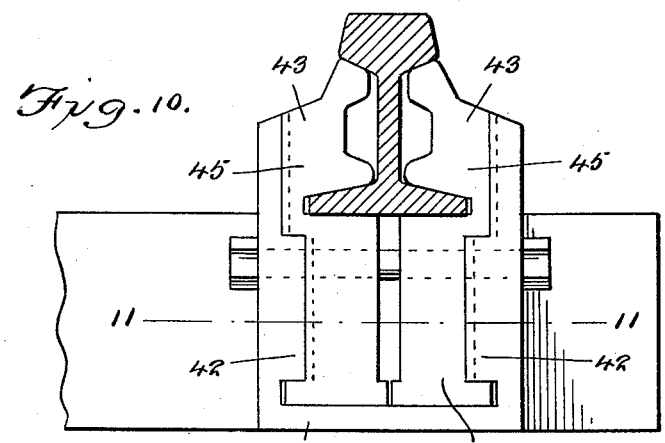
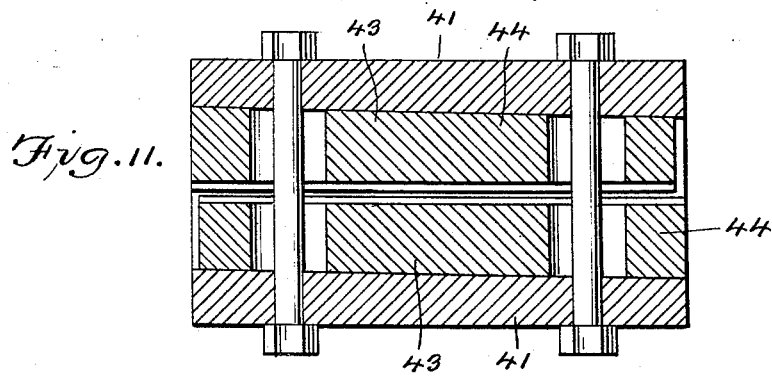
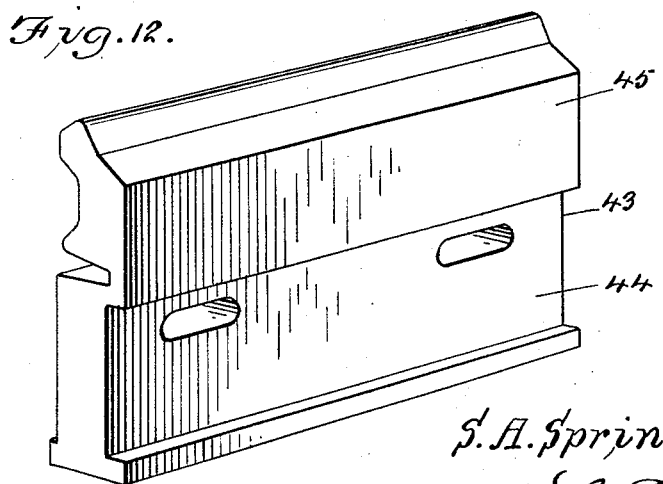
S. A. Sprinkle
INVENTOR
BY A. L. Evans
ATTORNEY Patented Dec. 29, 1931

1,839,058

UNITED STATES PATENT OFFICE

SYLVARIUS ALONZO SPRINKLE, OF MARTINSBURG, WEST VIRGINIA

RAIL JOINT

Application filed February 14, 1931. Serial No. 515,888.

My present invention has reference to a new and novel means for connecting the meeting ends of two railway rails. My object is the provision of a means for joining the ends of the rails in such manner as will prevent the sinking, side or tilting movement of the rails, which will retain the rails in positive alinement and which will compensate for the expansion and contraction of the rails.

A still further and important object is the provision of a rail joint that also affords a seat for the rails, so that the meeting ends of the rails are supported on the seat for a distance equaling the distance between two ties, and wherein the rails are wedgingly connected in a manner that will dispense with the employment of the usual bolts and nuts and which will dispense with the weakening of the rails by the provision of bolt openings in the webs thereof, the device being also susceptible for connecting rails provided with such bolt openings.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

In the drawings:

Figure 1 is a side elevation illustrating rail ends connected in accordance with this invention.

Figure 2 is a top plan view thereof.

Figure 3 is a transverse sectional view approximately on the line 3—3 of Figure 2.

Figure 4 is a sectional view approximately on the line 4—4 of Figure 3.

Figure 5 is a sectional view approximately on the line 5—5 of Figure 2.

Figures 6 and 7 are perspective views of the joint members

Figure 8 is a plan view illustrating a slight modification.

Figure 9 is a perspective view of one of the rail clamping and supporting members disclosed by Figure 8.

Figure 10 is an end elevation of another form of the improvement, the rail being in section.

Figure 11 is a sectional view approximately on the line 11—11 of Figure 10.

Figure 12 is a perspective view of the rail clamping and supporting member disclosed by Figures 10 and 11.

As disclosed by the drawings my improved joint for railway rails is of a length to be received between two of the ties 1 upon which the rails 2 are supported and to which ties the rails are spiked in the usual manner.

The improvement includes a hollow casting in the nature of a box-like member, and which member provides the body 3 of the joint structure. The confronting sides of the body casting 3 have, adjacent to their body, longitudinal projections in the nature of substantially rectangular ribs 4 affording both upper and lower shoulders 5 and 6, respectively, and the sides of the body, above the upper shoulders 5 are indicated for distinction by the numeral 7. The inner faces of the portions or plates 7 of the body are tapered longitudinally in opposite directions from their center to their ends and this is also true with respect to the ribs 4. These tapered walls are indicated, in the drawings, by the numerals 8 and 9, respectively.

There are designed to be received in the body casting 3 the rail supporting and gripping members. While these members are similarly constructed, they are, in the drawings, indicated for distinction by the numerals 10 and 11. Because of the similarity in construction a detail description of either of the members 10 and 11 may be taken as equally applicable to the other members. The members, from their opposite ends are formed with block-like body portions 12, the lower corners of each of the said bodies being formed with outwardly directed flanges or enlargements 13 of a size to be snugly received between the shoulders 6 of the ribs 4 of the body 3 and the lower and inner wall 14 of the said body 3. The block-like body portions 12 of the members 10 and 11 are designed for contacting engagement when arranged in the casting 3 so that the base portion of the combined rail rests and clamps is less than the length of the casting 3. The opposite sides of the blocks 12 are inclined outwardly from end to end, as indicated in the drawings by the numeral 15, so that the same will ride against the inclined walls 8 on the inner faces of the ribs 4, when the parts 12 of the members 10 and 11 are received in the casting 3. The base or block 12 of each of the members 10 and 11 is centrally slotted longitudinally, from its upper edge, as indicated in the drawings by the numeral 16, and the said block 12 is provided with a transverse and longitudinally extending elongated opening 17. The slots 16 terminate a suitable distance above the bottom of the blocks 12.

From its inner face and from what I will term the outer wall provided by the notch 16, each of the blocks 12 is formed with an extension in the nature of a plate 18 whose upper wall is arranged in a plane with the outer wall of the said block. The plate 18 is projected from the outer face of the block 12 to afford the under face of the said plate and the block 12 with a straight plane surface or shoulder 19 designed to rest on the shoulder 5 of the ribs 4 in the body casting. From the shoulder there is formed an outwardly projected portion 20 which, from a point adjacent its connection with the block, is thickened inwardly to afford the same with an inclined wall 21 that is arranged over the block or plate 18. The inclined wall merges into a cross sectionally rounded rib 22, and the inner and upper corner of the thickened portion of the extension 21 also merges into a rib 23. The rib 23 has an inner straight face and an upper angle wall 24. The plate 20, it will be noted, is thus in the nature of an ordinary ribbed fish plate and is designed to be received in the fishing space of the rails 2 so that the wall 21 will contact with the base flanges of the rails and the inclined surface 24 will underlie and contact with the heads of the rails.

The fish plate 20, on its outer face, and in a line with the juncture thereof with the block 12, is inclined, as at 25, and this inclined portion is designed to ride against one of the oppositely inclined walls or surfaces 8 on the plate extension 7 of the body casting 3. By providing the plates or extensions 7 with oppositely disposed inclined sides either of the rail engaging and clamping members 10 and 11 can be inserted in the body from either end of the said body, while the inclined blocks of the said members 10 and 11 will frictionally contact with the oppositely inclined walls 9 of the ribs 4 of the body casting 3. The rails before being spiked to the ties 1 are inserted between the fish plates from the opposite ends of the members 10 and 11 and thereafter there are passed through bolt openings in the sides of the body casting and through the elongated bolt openings 17 in the blocks 12 bolt members 26 which are engaged by suitable nuts 27.

As the plate extensions 18 for the blocks 12 extend in a plane with the upper faces of what I have termed the outer portions of the said blocks, the inner portions of the blocks, indicated in the drawings by the numeral 28, are reduced in height so that the upper edges of the said portions 28 are disposed below the outer portions of the blocks a distance equaling the thickness of the plates 18 and thereby afford a rest or support for the plate 18 of the cooperating members 10 and 11.

The outer face of each of the plates 20, from the end thereof, in a line with the block 12, is inclined, as at 29, the remainder of the said outer face being reduced and straight, as at 30, and by this arrangement the inclined wall 29 will contact and frictionally engage with one of the inclined walls 8 in the body casting when either of the members 10 and 11 is inserted into either end of the said body 3.

By constructing the body casting 3 of the box-like formation, and by forming the blocks 12 with the vertical longitudinal slots 16, both the body and the blocks are rendered yieldable and, therefore, when the nuts 27 are screwed home on the bolts 26 these elements will be caused to move toward each other sufficiently to exert a tight frictional engagement between the fish or rail plates of the respective members 10 and 11 and the rails engaged by such plates. In view of this the employment of the ordinary bolts for fastening the meeting ends of the rails 2 is entirely dispensed with and the said rails are held by the joint with greater rigidity than when rails are connected by the ordinary fish plates. The bases of the rails, of course, rest on the plates 18 and the upper faces of the blocks with which the plates aline and as the plates and blocks are of a length approximately equaling the distance between the adjacent ties 1 it will be noted that the rail ends are supported for a greater distance than is ordinary. The rails will be positively held from sinking, tilting, or lateral movement, but the said rails are afforded such longitudinal movement as is necessary in the expansion and contraction thereof.

In Figure 8 the box-like body or casting 31 is substantially similar to that previously described, the same being of a length to be received between two of the rail supporting ties. The body casting 31 is provided with a rib similar to the rib 4 previously referred to and the said rib affords the upper and lower shoulders and is projected beyond the upper shoulders to provide the plates 32. The ribs 33 have their inner faces inclined in opposite directions from the center to the ends thereof, as disclosed by the dotted lines and indicated by the numeral 34 in Figure 8 of the drawings. The inner or confronting faces of the plates 32 are inclined throughout their lengths from their diagonally opposed corners, as indicated in Figure 8 of the drawings by the numeral 35. The slotted base members or blocks 36 for the rail engaging and clamping elements are constructed in a manner similar to that previously described, the same having their outer faces, above their outstanding ribs 37 inclined, as at 38, and the outer faces of the fish plates or rail engaging and supporting portions 39, integrally formed with and extending beyond the inner ends of the blocks 36 have their outer walls inclined, as at 40, from one to their second end. By this arrangement it will be noted that the base or slotted block portions of the rail engaging and supporting members can be inserted from either side of the body casting 31, that the inclined walls 38 thereof will be in frictional contact with two of the opposed inclined walls 34 provided by the rib of the block throughout the length of the said inclined walls 38 and that the inclined outer faces 40 of the rail engaging and supporting portions of the elements will be in frictional or wedging contact with the inclined walls 38 of the plates 32 throughout the length of the fish plate or rail engaging and supporting elements of the improvement.

The elongated bolt holes that pass through the slotted base blocks 36 are disposed close to the outer ends of the said blocks, as disclosed by Figures 6 and 7 of the drawings.

If desired, the joint may be applied to the rail before the rails are laid or are spiked to the ties and it is believed that the foregoing description, when read in connection with the accompanying drawings, will fully set forth the construction and advantages of my improvement to those skilled in the art to which such invention relates without further detailed description.

In Figures 10 to 12 I have illustrated a further form of the improvement. In these figures the box-like body member 41 is substantially similar to that previously described, the rib 42 therein having its respective confronting faces inclined in opposite directions from end to end. The upstanding plates which project above the flanges 42 are also inclined on their inner faces throughout the length thereof, the tapered portions corresponding with the tapered faces of the ribs 42.

The rail supporting and clamping blocks 43, in this instance, are of a length approximately equalling that of the box-like body 41 and comprise two members that have their confronting faces, when arranged in the body 41, spaced away from each other. The base or block portion 44 of the members 43 are inclined to correspond with the inclined faces of the ribs as are the outer faces of the fish plates 45 which project from the base or block portions 44. The inner faces of the fish plates are similar to those previously described, and there is passed through the body member 41 and through elongated slots in the base or block portions 44 of the members 43 bolts which are engaged by nuts and which nuts when screwed home on the bolts force the members 43 toward each other and into tight frictional engagement with the rails which are arranged between the fish plates and are supported upon the outer horizontal flanges between the fish plates and the base or block portions 44.

Having described the invention, I claim:

1. A rail joint comprising a box-like casting of a length to be received between two of the ties on which the rail ends are supported, wedge blocks inserted in and from the opposite ends of the body, each having a fish plate on its outer corner to be received in the fishing spaces of the rails, and adjustable means passing transversely through the body and through the wedge blocks for compressing the sides of the body against the fish plates.

2. A rail joint comprising a box-like body, of a length to be received between two of the rail supporting ties and of a height greater than that of the ties, slotted wedge blocks inserted from the opposite ends of the body and having plate extensions from the outer walls of the slots and which extensions, with the blocks, have outer upstanding plates which are thickened inwardly to be received in the fishing spaces of the rails, the plates of one of the block members designed to rest on the inner upper portion of the cooperating block member and to receive thereon the base flanges of the rails, and removable and adjustable means passing transversely through the body and the slotted blocks for compressing the sides of the body against the blocks and for likewise compressing the slotted blocks to force the fish plates into tight frictional engagement with the rails.

3. A rail joint comprising a box-like body casting of a length to be received between two of the ties that support the rail ends thereon and of a height greater than that of the ties, the confronting faces of the blocks being formed with inwardly extending substantially rectangular ribs which are tapered from the center to the ends thereof, said ribs affording upper and lower shoulders and the portions of the sides above the upper shoulder having their inner faces inclined in opposite directions from the center to the ends thereof, metal blocks which are centrally and longitudinally slotted from their upper edges and which are wedge-shaped longitudinally and have their lower corners formed with outwardly extending flanges, said blocks designed to be inserted in the body casting from the opposite ends thereof, each of said blocks, from the slotted portion thereof being reduced in height and the other and outer and elevated portion of each of the blocks being formed with a plate extension from its inner end, the plate of one of the blocks designed to rest on the reduced portion of the cooperating block, said plates and outer corners of the blocks being widened to afford shoulders which rest on the upper shoulders of the body casting and being formed from said shoulders with upstanding plates, whose outer faces are inclined from one end to the center thereof for frictional contact with one of the outer inclined surfaces of the body casting, said plates having inner thickened portions whose lower walls are inclined and overlie the plates and blocks, the upper and lower corners of the said thickened portions being ribbed longitudinally to be received in the fishing spaces of the rails when the rails are arranged therebetween and rest on the plates and the portions of the blocks with which the plates are formed, said blocks having elongated openings therethrough, and bolt members passing through the sides of the body casting and through said openings and engaged by nuts.

4. A joint for the meeting ends of railway rails of a length to be received between the confronting faces of two of the ties on which the rails are laid, said joint including members which are wedgingly associated and which are susceptible of compression when engaged by nuts and bolts, and which also include plates on which the rails rest and fishing plates to be received in the fishing spaces of the rails.

5. A joint for supporting and clamping the meeting ends of railway rails of a length to be received between two of the supporting ties for the rails, including a box-like body casting having ribs on the confronting faces thereof which are inclined in opposite directions from the center to the ends thereof, rail clamping and supporting members having slotted block-like base portions whose outer faces are provided with lower ribs and whose faces above the ribs are oppositely inclined for wedging engagement with two of the opposed walls of the body, said base blocks being of a length less than one-half of the length of the body and having on their upper edges plates upon which the rails rest and fish plates that are received in the webs of the rails, and means passing through the box-like body and through the slotted blocks for compressing the body and blocks and causing the first plates to wedgingly engage in the fishing spaces of the rails.

6. A rail joint, a hollow base member whose sides are compressible, rail engaging fish plates having base portions on which the rails rest and having slotted bottom portions insertible, with the fish plates, from either end of the hollow base for wedgingly engaging therewith and securing means between the base and the bottom portions of the fish plates for compressing the sides of the base against said bottom portions and for compressing the sides of the slotted bottom portions toward each other.

7. A rail joint comprising a box-like body member of a length to be received and to contact with the confronting sides of two railway ties, rail supporting and engaging members wedgingly received in the body and disposed opposite each other, and said members being provided with horizontal ledges on which the rail ends rest and fish plates to be received in the fishing spaces of the rails and means passing through the body for forcing the members toward each other and into frictional contact with the rails.

8. A means for connecting the confronting ends of two railway rails, comprising a box-like body casting of a length to be received between and to contact with the confronting sides of two railway ties, and having wedge ribs on the inner sides thereof, and wedge surfaces above said ribs, a pair of combined rail supporting and engaging members designed to be received in the body and having wedge surfaces to contact with the wedge surfaces in the body, said members having their outer portions formed with horizontal surfaces on which the rails rest and fish plates above said surfaces to be received in the fishing spaces of the rails and means passing transversely through the body and the members for compressing the body against the members to cause the members to frictionally engage with the rails.

In testimony whereof I affix my signature.

SYLVARIUS ALONZO SPRINKLE.